Figure 1:
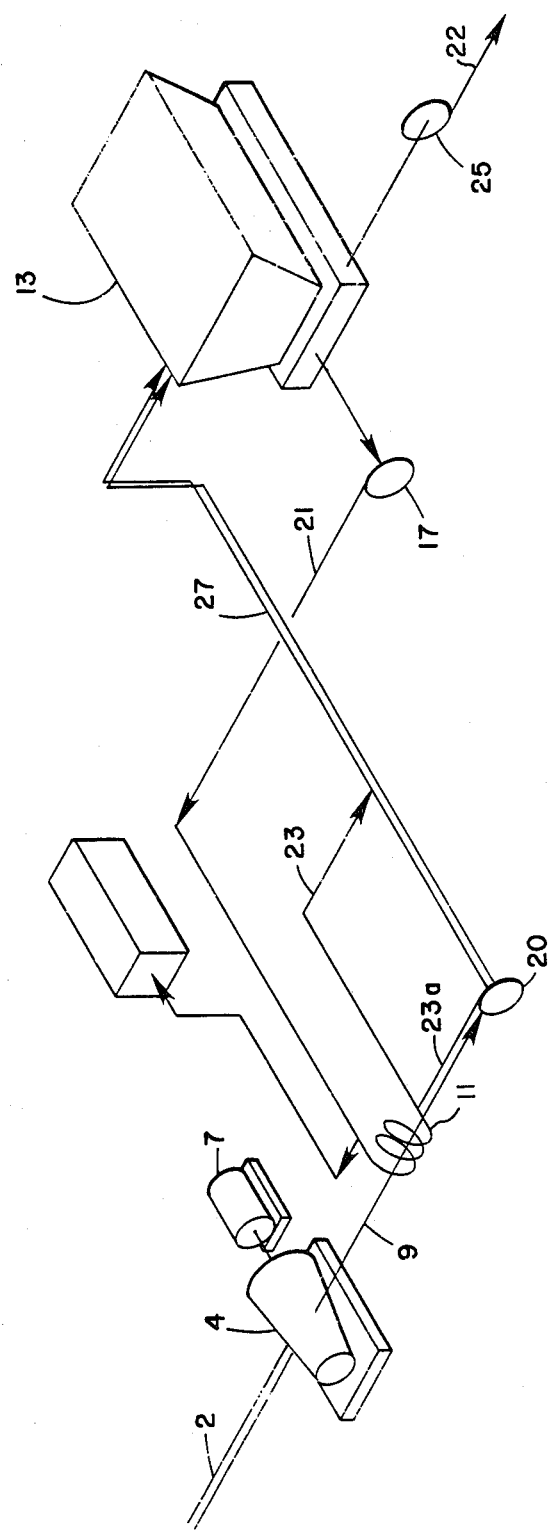

United States Patent [19]

Hills

[11] 4,388,194
[45] Jun. 14, 1983

[54] HYDROGEN SULFIDE ABATEMENT IN GEOTHERMAL STEAM SYSTEMS

[75] Inventor: William A. Hills, Lawrenceville, N.J.

[73] Assignee: FMC Corporation, Philadelphia, Pa.

[21] Appl. No.: 299,290

[22] Filed: Sep. 4, 1981

[51] Int. Cl.$^3$ .............................. C02C 1/40; C02B 5/02
[52] U.S. Cl. .................................... 210/697; 423/231;
423/234; 210/759; 210/763
[58] Field of Search ............... 423/224, 231, 232, 234,
423/DIG. 19; 210/696, 697, 759, 763

[56] References Cited

U.S. PATENT DOCUMENTS

| | | | |
|---|---|---|---|
| 2,304,850 | 12/1942 | Rice | 210/679 |
| 3,226,320 | 12/1965 | Meuly et al. | 210/763 |
| 3,622,273 | 11/1971 | Roberts et al. | 423/573 G |
| 3,705,098 | 12/1972 | Alexander | 210/759 |
| 4,076,621 | 2/1978 | Hardison | 210/698 |
| 4,151,260 | 4/1979 | Woertz | 423/224 |
| 4,189,462 | 2/1980 | Thompson | 423/573 G |

OTHER PUBLICATIONS

Castrantas, "The Use of Hydrogen Peroxide to Abate Hydrogen Sulfide in Geothermal Operations", Paper JPE 7882, Presented at the 1979 SPE of AIME Industrial Symposium on Oilfield and Geothermal Chemistry, Houston, Texas, 1979.

Primary Examiner—Earl C. Thomas
Attorney, Agent, or Firm—Robert D. Jackson; Eugene G. Horsky; Eugene G. Seems

[57] ABSTRACT

A method of preventing sludge deposition in the treatment of geothermal steam condensate with iron catalyzed/hydrogen peroxide by carrying out the treatment in the presence of an inorganic polyphosphate.

8 Claims, 2 Drawing Figures

GEOTHERMAL POWER PLANT
SURFACE CONDENSER TYPE

GEOTHERMAL POWER PLANT
DIRECT CONTACT CONDENSER TYPE

HYDROGEN SULFIDE ABATEMENT IN GEOTHERMAL STEAM SYSTEMS

This invention relates to abating hydrogen sulfide emissions in geothermal steam processes. It is particularly concerned with removing hydrogen sulfide from the steam condensates formed during operation of these processes.

The utilization of geothermal energy has been the subject of increased attention in recent years. Such activity stems from efforts to develop alternative energy sources and thereby lessen consumption of the world's rapidly diminishing supplies of non-renewable fossil fuels.

In a typical geothermal power plant layout, steam is conducted from underground reservoirs through appropriate piping into a turbine which drives a generator for the production of electric power. Steam leaving the turbine housing is sent to a condenser where one portion is condensed and another portion is vented. The steam condensate is used as cooling water which circulates between the condenser and a cooling tower. Excess steam condensate is sent to reinjection wells.

As it issues from the well, geothermal steam normally contains considerable quantities of hydrogen sulfide. Because of its objectionable odor and generally detrimental effect on the environment, release of the hydrogen sulfide into the atmosphere is not an acceptable practice.

In order to effectively control hydrogen sulfide emissions from geothermal plants, both the steam and condensate must be treated. For removing hydrogen sulfide from noncondensed gases, the so-called "Stretford" process is much used. In this process, which is described in U.S. Pat. No. 3,097,926, the noncondensable gas stream is contacted with an aqueous alkaline solution to remove hydrogen sulfide prior to being vented.

A method in commercial practice of freeing the steam condensate of sulfides, and the method with which the present invention is particularly concerned, is to treat the condensate with hydrogen peroxide in the presence of iron ions. This hydrogen peroxide/iron catalyst oxidative system converts the sulfides in the condensate to insoluble iron sulfides. The oxidation can proceed in several ways as depicted in the following series of reactions:

1. $H_2S + HO^- \rightarrow SH^- + H_2O$
2. $xSH^- + Fe^{+3} + xOH^- \rightarrow S_x + Fe^{+2} + xH_2O$
3. $Fe^{+2} + xSH^- + xOH^- \rightarrow FeS_x + xH_2O$
4. $Fe^{+3} + 3OH^- \rightarrow Fe(OH)_3$
5. $Fe^{+2} + H_2O_2 \rightarrow Fe^{+3} + .OH + OH^-$
6. $x.OH + xSH^- \rightarrow xH_2O + S_x$
7. $SH^- + 4H_2O_2 \rightarrow HSO_4^- + 4H_2O$ Although the iron/peroxide is highly effective in freeing the steam condensate of hydrogen sulfide and any other soluble sulfides, the resulting sludge of insoluble iron compounds causes operating problems by plugging process equipment such as heat exchanges, cooling tower nozzles and drift eliminators.

In accordance with the invention, it has been discovered that steam condensate from a geothermal power plant can be treated with an iron catalyzed hydrogen peroxide oxidant system to remove dissolved sulfides while preventing sludge formation by carrying out the treatment in the presence of an effective amount of soluble alkali metal, inorganic condensed polyphosphate.

The action of the polyphosphate in preventing sludge deposition is not fully understood. However, it is believed to involve the formation of a chelate complex of iron with the polyphosphate. Another possible explanation is that the insoluble iron compounds come down in the form of a colloidal dispersion; perhaps both of the aforesaid mechanisms or other unknown factors are involved. In any event, the presence of the polyphosphate does not interfere or diminish the efficacy of the iron/hydrogen peroxide system in removing hydrogen sulfide from geothermal steam condensates. Thus, all the benefits of the prior art treatment are retained while eliminating the disadvantage of sludge accumulation. The steam condensate, after treatment in accordance with the invention herein, is an essentially clear, brownish yellow liquid. It does not leave solid residues when circulated through process equipment such as cooling towers and heat exchanges. At the same time, the quantity of hydrogen sulfide and other contaminating sulfur compounds are reduced to an environmentally acceptable level, if present at all, in the exhaust gases vented to the atmosphere.

In carrying out the invention, the steam condensate is treated with the iron/hydrogen peroxide oxidant system in the known manner while adding sufficient polyphosphate to prevent deposition of sludge. Thorough mixing and distribution of the iron/hydrogen peroxide and polyphosphate throughout the condensate is necessary for optimum reaction rates and to minimize the quantity of reactants needed.

Because of the uncertainty regarding reaction mechanisms, it is difficult to establish the precise dosage of polyphosphate required to maintain a sludge-free condensate. Moreover, the contaminants in geothermal steam will vary from well to well, both with respect to type and quantity and these will have a bearing on the quantity of the iron/hydrogen peroxide oxidant required to provide a sulfide-free condensate. The quantity of iron in the oxidant system will in turn be a factor in determining the amount of polyphosphate to prevent deposition of insoluble iron compounds. Effective oxidant dosage for treating the condensate will be influenced by such variables as pH, presence of other heavy metals and sulfide concentration. In general, effective dosages of oxidant and polyphosphate can readily be ascertained by treating test samples of the steam condensate. The assay of the test specimen can then be used in computing the quantity of reactants needed to neutralize the sulfides in the plant condensate and keep it free of sludge.

The soluble, alkali metal polyphosphates used in the practice of the invention are the so-called condensed phosphates. These phosphorus-containing entities can be derived by the action of heat on an alkali metal orthophosphate. Three classes of condensed phosphates are generally recognized—pyrophosphates, tripolyphosphates and the higher polyphosphates. They can be formalistically depicted as follows:

| $M_4P_2O_7$ | $M_3P_3O_{10}$ | $(MPO_3)_n$ |
|---|---|---|
| I | II | III |
| Pyrophosphate | Tripolyphosphate | Higher Polyphosphate | wherein M represents an alkali metal and n is an integer of from about 6 to 21. The higher members of III are commonly referred to as phosphate glasses. Preferred condensed phosphates are the sodium and potassium salts, more preferably the sodium salts since these members are the most available and least costly.

Reference is now made to the drawings which are flow diagrams showing the invention being used to treat the steam condensate from a commercial geothermal steam turbine generator. In FIG. 1, a surface type condenser is employed; in FIG. 2, a direct contact condenser is utilized.

Turning to FIG. 1, steam from a geothermal well (not shown) is conducted via surface pipe line 2 into a turbine 4 which turns generator 7 for the production of electric power. Exhausted steam, at a temperature of 160°–180° C. is conveyed from the turbine 4 through pipe 9 into a surface condenser 11. Within the condenser 11, the steam is condensed and cooled by recycle steam condensate supplied from the cooling tower 13. The recycle steam condensate is pumped from the cooling tower 13 by circulating water pump 17 through inlet line 21 into the condenser 11 and is pumped therefrom by condensate pump 20 through main return line 27 by way of return branch lines 23 and 23a back to the cooling tower 13. Excess steam condensate is removed as needed from the cooling tower 13 through pipe 22 and sent to a reinjection well (not shown in drawing) by means of blowdown pump 25.

Figure 2:
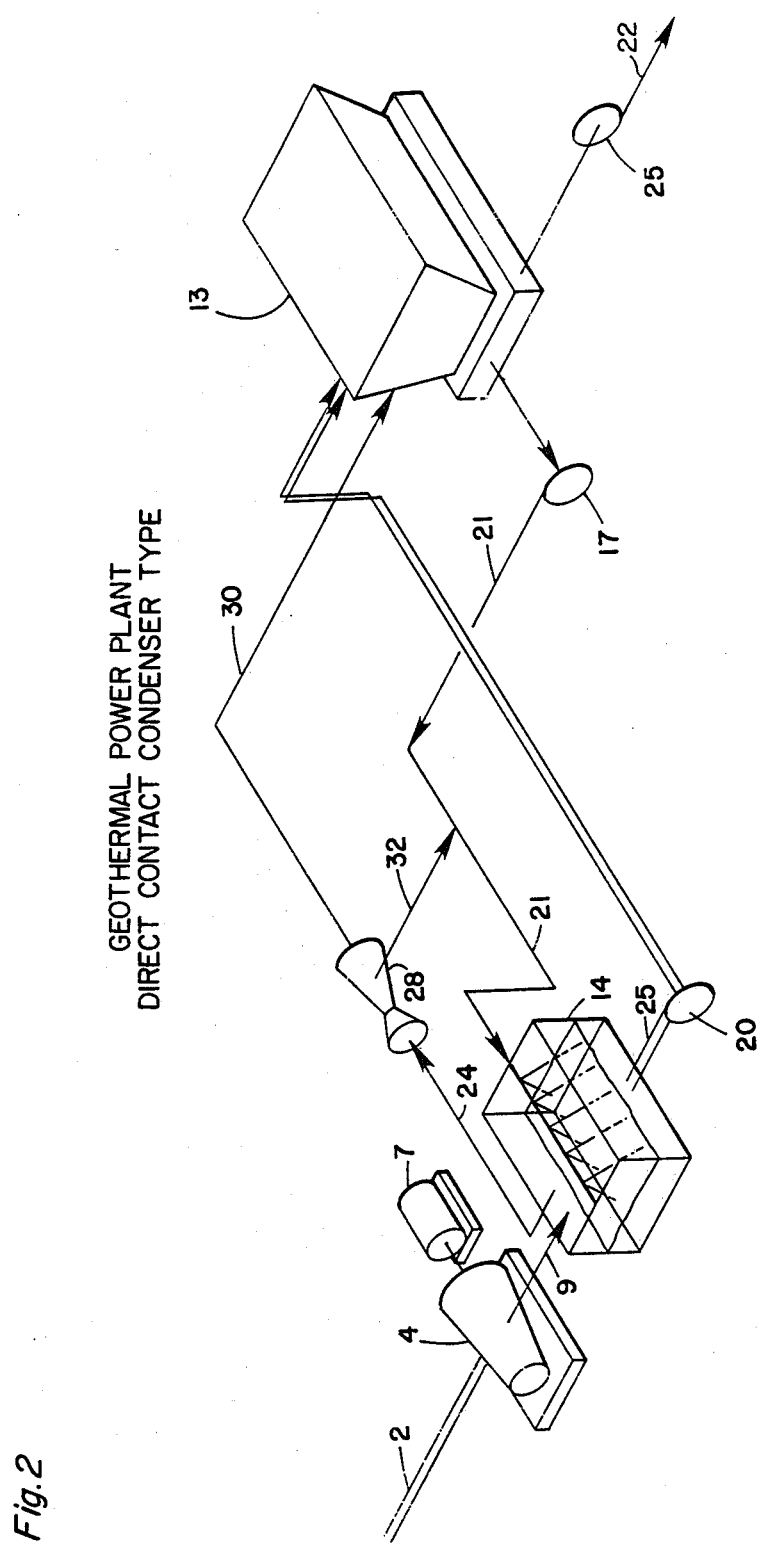

FIG. 2 is identical to FIG. 1 except that a direct contact condenser 14 is shown and the vent gases are treated differently. Referring to FIG. 2, vent gases are led through the vent pipe 24 from the turbine 4 and treated with an aqueous sodium hydroxide solution (typically 10 to 50% by weight NaOH) as they pass through the venturi of the eductor 28. The neutralized vent gases are then conveyed to the cooling tower 13 where they are scrubbed before releasing into the atmosphere. Condensible vapors entering the eductor 28 with the vent gases are returned to the recycle steam condensate circuit at inlet line 21. The invention is effected by introducing into the steam condensate stream as it leaves the condenser, an amount of hydrogen peroxide and soluble iron compound sufficient to oxidize the dissolved sulfur components and an amount of a polyphosphate herein sufficient to prevent the insoluble products of the peroxide/iron treatment from settling out and forming sludge. In general, the known procedure for treating geothermal steam condensate with an iron-catalyzed hydrogen peroxide system is followed, typical quantities of peroxide being about 1.0 to 1.5 moles per mole of hydrogen sulfide or total sulfur content of the condensate. Any soluble iron salt is a suitable source of the iron catalyst but ferrous sulfate is normally employed. The oxidation is largely completed by the time the condensate enters the cooling tower.

As previously indicated herein, the amount of polyphosphate required to keep the insoluble oxidation products from forming sludge does not conform to precisely known stoichiometry; presumably the polyphosphate ties up the iron and any other metal ions as a chelate complex although what happens to the sulfide is an open question. Suffice to say, that whatever mechanism(s) is involved, the presence of the polyphosphate does not interfere with the capacity of the iron catalyzed hydrogen peroxide to oxidize or neutralize the sulfides in the condensate. The effective dosage of polyphosphate needed to keep the condensate free of iron containing sludge is easily ascertained by withdrawing test specimens of the condensate and noting the quantity of iron catalyzed hydrogen peroxide and polyphosphate required to provide a clear oxidized condensate. Reaction times are typically about 15 seconds for neutralizing the hydrogen sulfide of most condensate streams.

The polyphosphates which are most preferred are the condensed sodium polyphosphates, particularly sodium tripolyphosphate. Addition of the polyphosphate to the condensate can be effected separately or with the iron-catalyzed hydrogen peroxide oxidant system. The polyphosphate should be present while the oxidation of the sulfides is carried out, for example, before formation of iron-containing sludge occurs; pH conditions can vary considerably but are desirably controlled in the range of 7.5 to 9.2.

Reference is now made to the following examples and procedures.

Preparation of Solutions

A sulfide stock solution was prepared by dissolving 100 g of $Na_2S.9H_2O$, analytical grade in 100 ml of deionized water. Dissolution was slow, requiring several days. The pH of the solution was 11.3. The solution was stored at room temperature in a tightly stoppered bottle. There was no detectable change in sulfide concentration over several months.

Test solutions were prepared from stock solutions. One milliliter of stock solution was diluted to 1000 ml with deaerated, deionized water to produce a solution containing 75 mg/L of sulfide ion at pH 11.1. This solution was titrated daily using 0.01 N $AgNO_3$ and an Orion sulfide/silver electrode Model 94–16.

A catalyst solution (Fe) was prepared by dissolving the salt ($FeSO_4$) of the metal in deionized water. The solution contained one milligram of metal per seven (7) milliliter of solution. The stock solution was diluted to the appropriate level as needed.

Complexing agent solutions were prepared by dissolving the sodium salt of the polyphosphate in deionized water to make 0.01 M solutions. These solutions were diluted to the appropriate level as needed.

Procedure

One hundred milliliters of the sulfide test solution were placed in a 250 ml glass beaker and heated to and maintained at 50° C. in a thermostatically heated bath. The pH was adjusted to 9±0.5 with a solution of 1 N sulfuric acid. The catalyst (Fe) complexing agent and hydrogen peroxide were then added. The reaction mixture was observed visually to determine the extent of precipitation (sludge formation).

EXAMPLE 1

Control of Iron Sulfide Precipitation at [Fe] = mg/L

A 100 ml sulfide test solution (S concentration = 60 mg/L) was placed in a 250 ml beaker, heated to 50° C. in a thermostatically controlled bath and the pH adjusted to 9–9.5 with 1 N $H_2SO_4$. Catalyst (Fe) solution was added to achieve a concentration of 10 mg/L g iron, then the appropriate amount of complexing agent added and 140 mg/L of $H_2O_2$ added. The results show that it took a minimum ratio of 3.7 × 10.4 g of complexing agent per g of iron to prevent iron sulfide precipitation (sludge) formation.

Below 10 mg/L of iron, no complexing agent appears to be necessary to prevent sludge formation.

EXAMPLE 2

Control of Iron Sulfide Precipitation at [Fe]=50–100 mg/L

A 100 ml sulfide solution (S concentration=117–120 mg/L) was placed in a 250 ml beaker, heated to 50° C. in a thermostatically controlled bath and the pH adjusted to 9–9.5 with 1 N $H_2SO_4$. The catalyst (Fe) solution was added to achieve a concentration of 50–100 mg/L of iron; then 250–500 mg/L of $H_2O_2$ was added. The pH was adjusted to 9.2 when necessary with dilute NaOH. The results are summarized in Table I.

Using the methods and materials aforesaid, additional sodium polyphosphates were tested on iron solutions at two different levels of iron concentrations. The results of these tests are summarized in Tables IIA and IIB respectively.

The data in these tables clearly demonstrate the efficacy of the herein polyphosphate in preventing iron sulfide precipitation during treatment of sulfide solutions with an iron catalyzed hydrogen peroxide oxidant system.

TABLE I
CONTROL OF IRON SULFIDE PRECIPITATION WITH SODIUM TRIPOLYPHOSPHATE (STPP)

| Exp. No. | [S⁻] | [Fe] | [STPP] | pH Adjustment | [$H_2O_2$] | Precipitation Instant | 2 Hr. | 24 Hr. | 100 Hr. | 4 Months |
|---|---|---|---|---|---|---|---|---|---|---|
| 1 | 120 | 10 | — | — | 250 | No | No | No | | VS |
| 2 | | 50 | — | — | 500 | No | Yes | — | | — |
| 3 | | 100 | — | — | 250 | Yes | — | — | | — |
| 4 | | 100 | 5 | — | 250 | Yes | — | — | | — |
| 5 | | 100 | 20 | — | 250 | No | Yes | — | | — |
| 6 | | 100 | 50 | — | 250 | No | No | No | Yes | — |
| 7 | | 100 | 75 | — | 250 | No | No | No | | Yes |
| 8 | | 100 | 100 | — | 250 | No | No | No | | Yes |
| 9 | | 100 | 125 | — | 250 | No | No | No | | VVS |
| 10 | | 100 | 150 | — | 250 | No | No | No | | VVS |
| 11 | | 100 | 60 | Yes | 300 | No | No | No | | VVS |
| 12 | | 100 | 60 | Yes | 500 | No | No | No | | VVS |
| 13 | | 100 | 150 | Yes | 300 | No | No | No | | Heavy |

VS = Very slight amount of precipitation
VVS = Very, very slight amount of precipitation

TABLE IIA

| $Na_4P_2O_7$ Precipitation (days) | | | | | $Na_4P_2O_7 \cdot 10H_2O$ Precipitation (days) | | | | |
|---|---|---|---|---|---|---|---|---|---|
| mg/L | I | 1 | 3 | 5 | mg/L | I | 1 | 3 | 5 |
| 2.89 | S | | | | 4.85 | S | | | |
| 7.23 | | S | | | 12.10 | | VS | | |
| 14.50 | | VS | | | 24.30 | | VS | | |
| 29.00 | | | VS | | 48.50 | | | | 0 |
| 58.00 | | | | 0 | 97.00 | | | | 0 |

| $(NaPO_3)_6$ Precipitation (days) | | | | | $(NaPO_3)_{13}$ Precipitation (days) | | | | |
|---|---|---|---|---|---|---|---|---|---|
| mg/L | I | 1 | 3 | 5 | mg/L | I | 1 | 3 | 5 |
| 7.3 | S | | | | 15.1 | | VS | | |
| 18.3 | | VS | | | 37.7 | | VS | | |
| 36.6 | | | 0 | | 75.0 | | | | 0 |
| 73.3 | | | 0 | | 151.0 | | | | 0 |
| 146.6 | | | | 0 | 302.0 | | | | 0 |

| $(NaPO_3)_{21}$ Precipitation (days) | | | | |
|---|---|---|---|---|
| mg/L | I | 1 | 3 | 5 |
| 24.0 | | VS | | |
| 59.9 | | VS | | |
| 120.0 | | | VS | |
| 239.0 | | | | 0 |
| 478.0 | | | | 0 |

0 = no precipitation
VS = very slight precipitation
S = slight precipitation
I = instant precipitation

TABLE IIB

| $Na_4P_2O_7$ Precipitation (days) | | | | | $Na_4P_2O_7 \cdot 10H_2O$ Precipitation (days) | | | | |
|---|---|---|---|---|---|---|---|---|---|
| mg/L | I | 1 | 3 | 5 | mg/L | I | 1 | 3 | 5 |
| 36 | | VS | | | 60 | | VS | | |
| 54 | | | VS | | 90 | | | | VS |
| 72 | | | VS | | 121 | | | | VS |
| 110 | | | | 0 | 181 | | | | VS |

| $(NaPO_3)_6$ Precipitation (days) | | | | | $(NaPO_3)_{13}$ Precipitation (days) | | | | |
|---|---|---|---|---|---|---|---|---|---|
| mg/L | I | 1 | 3 | 5 | mg/L | I | 1 | 3 | 5 |
| 92 | | VS | | | 188 | | VS | | |
| 137 | | VS | | | 283 | | VS | | |
| 183 | | | VS | | 377 | | | | VS |
| 275 | | | VS | | 566 | | | | VS |

| $(NaPO_3)_{21}$ Precipitation (days) | | | | |
|---|---|---|---|---|
| mg/L | I | 1 | 3 | 5 |
| 299 | | VS | | |
| 499 | | VS | | |
| 599 | | | VS | |
| 898 | | | | VS |

0 = no precipitation
VS = very slight precipitation
S = slight precipitation
I = instant precipitation

What is claimed is:

1. In the process of removing hydrogen sulfide from an aqueous waste stream including steam condensate from a geothermal power plant by treating the stream with an iron catalyst/hydrogen peroxide oxidant system, the improvement of preventing deposition of sludge comprising carrying out the treatment in the presence of an effective amount of a soluble polyphosphate selected from the class consisting of:

| $M_4P_2O_7$ | $M_3P_3O_{10}$ | $(MPO_3)_n$ |
|---|---|---|
| I | II | III |

| Pyrophosphate | Tripolyphosphate | Higher Polyphosphate |
| --- | --- | --- | wherein M represents an alkali metal and n is an integer of from about 6 to 21.

2. The process according to claim 1 wherein the treatment is carried out in a pH range of about 7.5 to 9.

3. The process according to claim 2 wherein the polyphosphate is tetrasodium pyrophosphate of the formula:

$$Na_4P_2O_7.$$

4. The process according to claim 2 wherein the polyphosphate is tetrasodium pyrophosphate decahydrate of the formula:

$$Na_4P_2O_7.10H_2O.$$

5. The process according to claim 2 wherein the polyphosphate is sodium tripolyphosphate of the formula:

$$Na_3P_3O_{10}.$$

6. The process according to claim 2 wherein the polyphosphate is a polyphosphate of the formula:

$$(NaPO_3)_6.$$

7. The process according to claim 2 wherein the polyphosphate is a polyphosphate of the formula:

$$(NaPO_3).$$

8. The process according to claim 2 wherein the polyphosphate is a polyphosphate of the formula:

$$(NaPO_3)_{21}.$$

* * * * *